United States Patent
Shin et al.

(10) Patent No.: US 8,861,414 B2
(45) Date of Patent: *Oct. 14, 2014

(54) REDUCING ENERGY CONSUMPTION IN WIRELESS DEVICES

(75) Inventors: Kang G. Shin, Ann Arbor, MI (US); Xinyu Zhang, Ann Arbor, MI (US)

(73) Assignee: The Regents of The University of Michigan

( * ) Notice: Subject to any disclaimer, the term of this patent is extended or adjusted under 35 U.S.C. 154(b) by 262 days.

This patent is subject to a terminal disclaimer.

(21) Appl. No.: 13/439,900

(22) Filed: Apr. 5, 2012

(65) Prior Publication Data

US 2012/0257558 A1  Oct. 11, 2012

Related U.S. Application Data

(60) Provisional application No. 61/473,356, filed on Apr. 8, 2011.

(51) Int. Cl.
*G08C 17/00* (2006.01)
*H04W 52/02* (2009.01)

(52) U.S. Cl.
CPC ........ *H04W 52/0229* (2013.01); *H04W 52/029* (2013.01); *Y02B 60/50* (2013.01)
USPC ....................................................... 370/311

(58) Field of Classification Search
CPC .. G07C 5/0866; H04L 47/6275; H04L 49/25; H04N 7/183; H04W 4/046; H04W 52/02; H04W 52/0216; H04W 52/0229; H04W 84/12; H04W 84/18
See application file for complete search history.

(56) References Cited

U.S. PATENT DOCUMENTS

| | | | | |
|---|---|---|---|---|
| 4,114,155 A | * | 9/1978 | Raab .............................. | 342/394 |
| 5,187,471 A | | 2/1993 | Wagai et al. | |
| 6,009,319 A | * | 12/1999 | Khullar et al. ................ | 340/7.38 |
| 6,038,233 A | * | 3/2000 | Hamamoto et al. .......... | 370/401 |
| 6,043,848 A | * | 3/2000 | Richter .......................... | 348/465 |
| 6,269,043 B1 | * | 7/2001 | Batcher ......................... | 365/227 |
| 6,397,053 B1 | * | 5/2002 | Ghiazza ..................... | 455/343.1 |

(Continued)

FOREIGN PATENT DOCUMENTS

| | | |
|---|---|---|
| EP | 1322061 | 6/2003 |
| KR | 100965612 | 6/2010 |
| WO | WO2007/111941 | 10/2007 |

OTHER PUBLICATIONS

K. Jamieson et al "PPR: Partial Packet Recovery for Wireless Networks", SIGCOMM'07, (Aug. 2007).

(Continued)

*Primary Examiner* — Yong Zhou
(74) *Attorney, Agent, or Firm* — Harness, Dickey & Pierce, P.L.C.

(57) ABSTRACT

Techniques are provided for reducing power consumption in wireless communication devices. During an idle listening period, the clock rate of the receiver in the device is reduced. Data packets received by the receiver are then sampled at the reduced clock rate. A determination is made as to whether the data packet is intended for the device. The clock rate is restored to the full clock rate when the data packet is intended for the device. On the other hand, the receiver continues to operate at the reduced clock rate when the data packet is not intended for the device.

22 Claims, 13 Drawing Sheets

(56) References Cited

U.S. PATENT DOCUMENTS

| | | | |
|---|---|---|---|
| 7,555,004 B2 | 6/2009 | Orlik et al. | |
| 8,112,650 B2 * | 2/2012 | Qing et al. | 713/321 |
| 2004/0218699 A1 | 11/2004 | Carsello | |
| 2006/0215556 A1 | 9/2006 | Wu et al. | |
| 2007/0006007 A1 * | 1/2007 | Woodbridge et al. | 713/322 |
| 2007/0082647 A1 * | 4/2007 | Behzad et al. | 455/343.1 |
| 2009/0131098 A1 | 5/2009 | Khandekar | |
| 2010/0290352 A1 | 11/2010 | Oyman et al. | |
| 2012/0063335 A1 * | 3/2012 | Cho et al. | 370/252 |

OTHER PUBLICATIONS

E. Shih et al "Wake on Wireless: An Event Driven Energy Saving Strategy for Battery Operated Devices", MOBICOM'02 (Sep. 2002).

L. Shang et al "Dynamic Voltage Scaling With Links for Power Optimization of Interconnection Networks", HPCA-9'03 (Sep. 2003).

W. Dieter et al "Power Reduction by Varying Sampling Rate", ISLPED'05 (Aug. 2005).

* cited by examiner

REDUCING ENERGY CONSUMPTION IN WIRELESS DEVICES

CROSS-REFERENCE TO RELATED APPLICATIONS

This application claims the benefit of U.S. Provisional Application No. 61/473,356, filed on Apr. 8, 2011. The entire disclosure of the above application is incorporated herein by reference.

GOVERNMENT CLAUSE

This invention was made with government support under grant number CNS0905143 awarded by the National Science Foundation. The government has certain rights in this invention.

FIELD

The present disclosure relates to reducing energy consumption in wireless devices.

BACKGROUND

Continuing advances of physical-layer technologies have enabled WiFi to support high data-rates at low cost and hence become widely deployed in networking infrastructures and mobile devices, such as laptops, smartphones, netbooks, and tablet PCs. Despite its high performance and inexpensive availability, the energy-efficiency of WiFi remains a challenging problem. For instance, WiFi accounts for more than 10% of the energy consumption in current laptops. It may also raise a GSM cellphone's power consumption 14 times even without packet transmissions.

WiFi's energy-inefficiency comes from its intrinsic CSMA mechanism—the radio must perform idle listening (IL) continuously, in order to detect unpredictably arriving packets or assess a clear channel. The power consumption of IL, unfortunately, is comparable to that of active transmission/reception. Even worse, WiFi clients tend to spend a large fraction of time in IL, due to MAC-level contention and network-level delay. Therefore, minimizing the IL's energy consumption is crucial to WiFi's energy-efficiency.

A natural way to reduce the IL's energy cost is sleep scheduling. In WiFi's power-saving mode (PSM) and its variants, clients can sleep adaptively, and wake up only when they intend to transmit, or expect to receive packets. The AP buffers downlink packets and transmits only after the client wakes up. PSM essentially shapes the traffic by aggregating downlink packets, thereby reducing the receiver's wait time caused by the network-level latency. However, it cannot reduce the IL time associated with carrier sensing and contention. Through an extensive trace-based analysis of real WiFi networks, it was found that IL still dominates the clients' energy consumption even with PSM enabled: it accounts for more than 80% of energy consumption for clients in a busy network and 60% in a relatively idle network.

Since the IL time cannot be reduced any further due to WiFi's CSMA, an additional dimension—reducing IL power consumption—is exploited in order to minimize its energy cost. Ideally, if the exact idle period is known, the radio could be powered off or put to sleep during IL, and wake up and process packets on demand. However, due to the distributed and asynchronous nature of CSMA, the idle time between packets varies widely and unpredictably. Under-estimation of an idle interval will waste the mobile device's energy, while an over-estimation causes the radio to drop all incoming packets during the sleep.

Therefore, it is desirable to reduce the power consumption during the idle listening period and thereby reduce the power consumption of wireless mobile devices. This section provides background information related to the present disclosure which is not necessarily prior art.

SUMMARY

A computer-implemented method is proposed for reducing power consumption of a wireless communication device. The method includes: reducing clock rate of a clock during an idle listening period of the device; detecting the presence of a new packet at the reduced clock rate; determining whether the data packet is intended for the device based on a customized preamble preceding the data packet; and restoring the clock rate to the full clock rate when the data packet is intended for the device. Conversely, continue operating the clock at the reduced clock rate when the data packet is not intended for the device.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
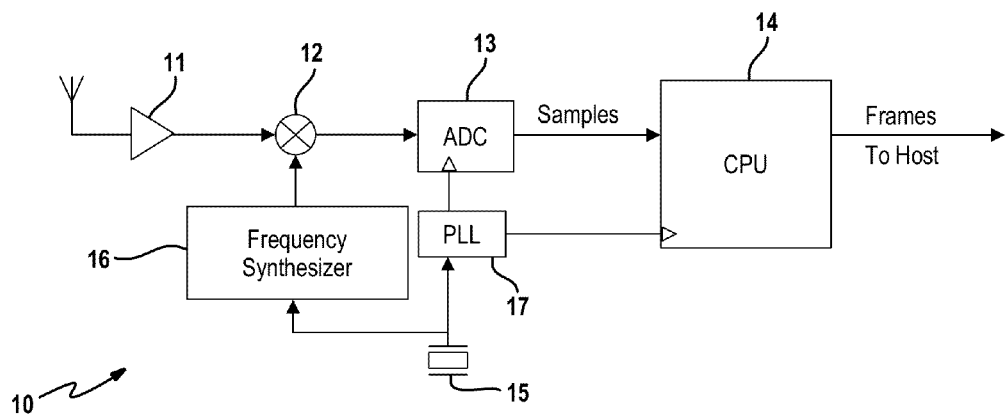
FIG. 1 is a diagram depicting the architecture of a typical WiFi receiver.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Intuitively, a radio should consume less power when it is not actively decoding or transmitting packets, but the idle listening (IL) power of commodity WiFi and other carrier-sensing wireless devices (e.g., ZigBee) is comparable to their transmit and receive power. By anatomizing the radio hardware, the reason for this is understood.

FIG. 1 illustrates the architecture of a typical WiFi receiver 10 (e.g., based on an Atheros 802.11 chip). An incoming signal is first passed through the RF and analog circuit, amplified and converted from RF (e.g., 2.4 GHz) to the baseband by a mixer 12. The analog baseband signal is sampled by an Analog-to-Digital Converter (ADC) 13, and the resulting discrete samples are passed to the CPU (baseband and MAC processor) 14, which decodes the signal and recovers the original bits in the data frame. The entire radio is driven by a 40 MHz crystal oscillator 15, which feeds two paths. The first path is the frequency synthesizer 16 that generates the center frequency used for the RF and analog mixer 12. The other path is a clock generating circuit 17 (e.g., Phase-Locked-Loop (PLL)) that generates the clocking signal for the digital circuit: the sampling clock for the ADC, as well as the main clock for the CPU.

Existing studies have shown the ADC and CPU to be the most power-hungry components of a receiver. In the Atheros 5001X chipset, for example, they account for 55.3% of the entire receiver power budget. ADC and CPU power consumptions are also similar (1.04:1). During IL, both the analog circuits and the ADC operate at full workload as in the receiving mode. Moreover, the decoding load of the CPU is alleviated, but it cannot be put into sleep—it needs to operate at full clock-rate in order to perform carrier sensing and packet detection. This is the reason why IL power consumption is comparable to that of receiving packets.

A similar line of reasoning applies to other wireless transceivers such as software radios. In software radios, the ADC feeds the discrete samples to an FPGA, which may further decimate (downsample) the samples and then send them to a general processor that serves as the baseband CPU. The similarity in hardware components implies that software radios are likely to suffer from the same problem with IL. Considering the trend of software radios getting gradually integrated into mobile platforms to reduce the area cost, it is imperative to incorporate a mechanism to reduce their IL power.

To reduce the IL power, this disclosure proposes slowing down the clock that drives the digital circuitry in a radio. Modern digital circuits dissipate power when switching between logic levels, and their power consumption follows $P \propto V_{dd}^2 f$, where $V_{dd}$ is the supply voltage and $f$ the clock-rate. Hence, a linear power reduction can be achieved by reducing clock-rate. In practice, due to the analog peripherals, the actual reduction is less than ideal. For example, in the ADC used by an Atheros WiFi chip, halving the sampling clock-rate results in a 31.4% power reduction. Here, using detailed measurements, the actual effects of reducing the clock-rate are verified for both WiFi NIC and the USRP software radio.

According to IEEE 802.11-2007, the OFDM-based PHY supports 2 downclocked operations with 10 MHz (half-clocked) and 5 MHz (quarter-clocked) sampling-rate, in addition to the default full-clocked 20 MHz operation. These two modes are tested on the LinkSys WPC55ag nic (version 1.3, Atheros 5414 chipset), with a development version of Madwifi (trunk-r4132), which supports 8 half-clocked and 18 quarter-clocked channels at the 5 GHz band. The downclocked modes can be enabled by activating the "USA with ½ and ¼ width channels" regulatory domain on the NIC.

As to measurement of the WiFi's power consumption, the approach is similar to that of Atheros Communications in "Power Consumption and Energy Efficiency of WLAN Products". The NIC is attached to a laptop (e.g., Dell 5410) powered with an external AC adapter, and use a passive current probe (e.g., HP1146A) and voltage probe (e.g., HP1160) together with a 1 Gsps oscilloscope (e.g., Agilent 54815A) to measure the power draw. The actual power consumption is the difference between the measured power level in different radio modes and the base level with the NIC removed. During the measurement, the WiFi is tuned to a channel unused by ambient networks. The IL power is measured when the NIC is activated but not transmitting/receiving packets. The TX/RX power is measured when the WiFi is sending/receiving one-way ping-broadcast packets at the maximum rate (100 packets per second). The different clock modes are configured to use the same bit rate (6 Mbps) and packet size (1 KB). Table 1 below shows the measurement results (power consumption shown in Watts).

|  | Rate = 1 | Rate = ½ | Rate = ¼ |
| --- | --- | --- | --- |
| Idle | 1.22 | 0.78 | 0.64 |
| RX | 1.66 | 1.44 | 0.98 |
| TX | 1.71 | 1.46 | 1.21 |

It can be seen that the power consumption decreases monotonically with clock-rate. In particular, compared to a full-clocked radio, the IL power is reduced by 36% and 47.5% for half-clocked and quarter-clocked mode, respectively. The absolute reduction is found different from that reported in an existing measurement study. This discrepancy results may be caused from the use of a different WiFi card (i.e., Atheros 5212) in their experiment. Different NICs have very different power profiles at different clock-rates. To confirm that the power consumption vs. clock-rate relation is not limited to the WiFi radio, experiments are also conducted with the USRP software radio.

The original USRP is driven by an internal 64 MHz clock, which is used by both the ADC and FPGA. The external clocking feature is enabled by resoldering the main clock circuit, following the instructions from Ettus Research LLC in "Universal Software Radio Peripheral (USRP)". The USRP E100 is used as an external clock source, which as a programmable clock generator (AD9522) that produces reference clocks below 64 MHz. Since the USRP E100 cannot be tuned to signals below 32 MHz, a signal generator is used to produce clock signals below 32 MHz, with the same configuration as those produced by the E100.

An XCVR2450 daughter board is mounted on the USRP, which was then connected to the PC host (e.g., Dell E5410 laptop). The IL mode runs the standard 802.11a/g carrier sensing and packet detection algorithm as will be further described below. The TX mode sends a continuous stream of samples prepended with 802.11 preambles. Since a complete 802.11 decoding module is unavailable, only the IL and TX power is measured. The USRP power is measured directly with the oscilloscope and current/voltage probes, and then added to the power consumption of the external clock, which is 0.55 W and does not vary with clock-rates. Note that the normal clock-rate of USRP is 64 MHz, whereas the maximum signal bandwidth sent to the PC is 4 MHz since the FPGA downsamples (decimates) the signals. While reducing the clock-rate, the signal bandwidth is decreased by the same ratio by adjusting the decimation rate.

Table 2 below shows the measurement results.

|    | rate = 1 | rate = ½ | rate = ¼ | rate = ⅛ | rate = 1/16 |
|----|----------|----------|----------|----------|-------------|
| IL | 10.27    | 7.96     | 7.07     | 6.54     | 5.88        |
| TX | 6.36     | 5.69     | 5.18     | 4.7      | 4.47        |

Similar to a WiFi radio, the USRP power consumption decreases monotonically with clock-rate. A power reduction of 22.5% (36.3%) is achieved for a downclocking factor of 2 (8). At a 4 MHz clock-rate (a downclocking factor of 16), the USRP can no longer be tuned to the 2.4 GHz center frequency, but the ADC can still be tuned correctly to 4 MHz sampling rate, and power consumption decreases further.

Since the PC host consumes a negligible amount of power when processing the 4 MHz signal, its power consumption is omitted from Table 2. Future mobile software radio systems may incorporate dedicated processors to process the baseband signals. By reducing the processors' clock-rate in parallel with the ADC and FPGA, the entire software radio platform can achieve higher energy-efficiency. While reference is made primarily to WiFi and USRP, it is readily understood that the concepts presented in this disclosure are extendable to other types of wireless communication protocols and devices, such as ZigBee.

Figure 2:
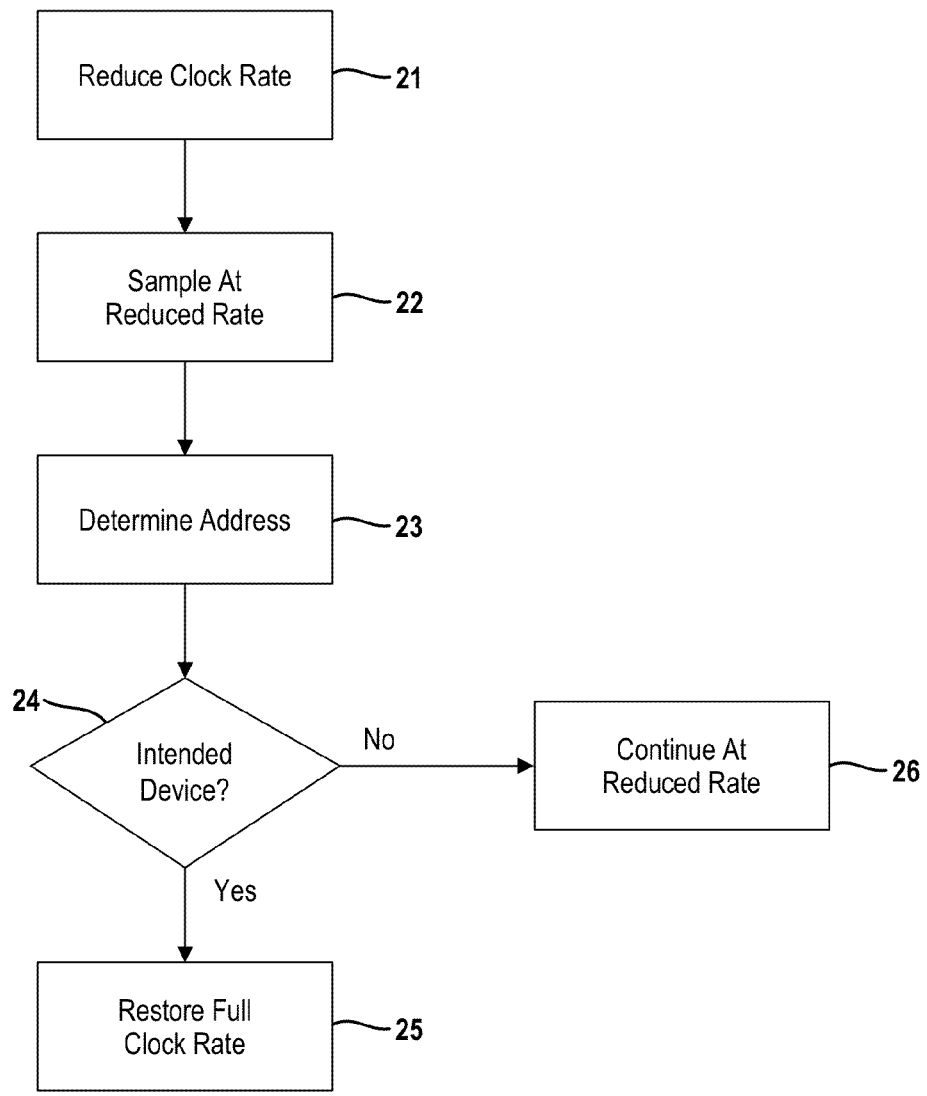
FIG. 2 is a flowchart providing an overview of a proposed method for reducing power consumption in wireless communication devices.

FIG. 2 provides an overview of the proposed method for reducing power consumption in such wireless communication devices. During an idle listening period, the clock rate of the receiver in the device is reduced as indicated at 21. Data packets received by the receiver are then sampled at 22 at the reduced clock rate. A determination is made at 24 as to whether the data packet is intended for the device. The clock rate is restored at 25 to the full clock rate when the data packet is intended for the device. On the other hand, the receiver continues to operate at the reduced clock rate at 26 when the data packet is not intended for the device. Thus, the clock-rate is controlled on a fine-grained per-packet basis, in order to reduce the energy consumption of IL. It opportunistically downclocks the radio during IL, and then restores it to full clock-rate before transmitting or after detecting a packet.

Figure 3A:
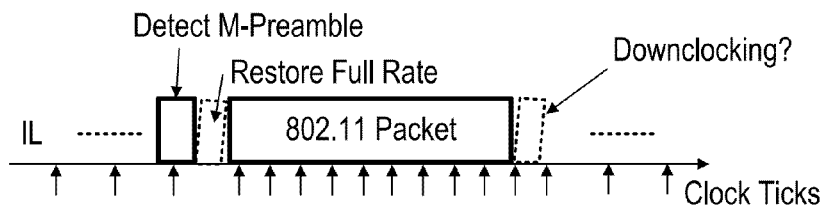
FIGS. 3A and 3B are diagrams depicting the flow of operations when data packets are received and transmitted, respectively, in accordance with the proposed method.
Figure 3B:
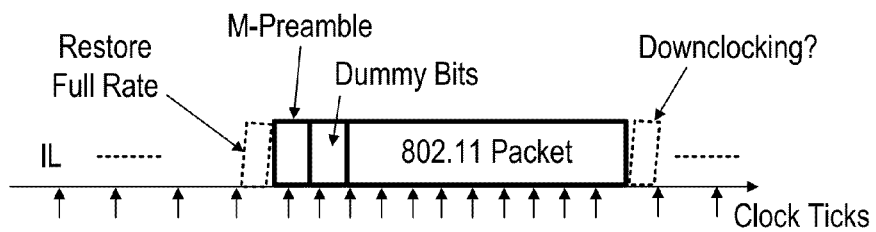

FIGS. 3A and 3B illustrate the flow of core operations when data packets are received and transmitted, respectively. An additional preamble, referred to herein as M-preample, is prepended to each 802.11 packet. During its IL period, a downclocked receiver continuously senses the channel and looks for the M-preamble, using the sampling rate invariant detection (SRID) algorithm further described below. Upon detecting an M-preamble, the receiver immediately switches back to full clock-rate, and calls the legacy 802.11 decoder to recover the packet. The receiver leverages an implicit PHY-layer addressing mechanism in SRID to filter the M-preamble intended for other nodes, and hence prevents unnecessary switching of clock-rate.

A transmit operation follows the legacy 802.11 MAC, except that the carrier sensing is done by SRID. If the radio is downclocked during carrier sensing and backoff, it needs to restore full clock-rate before the actual transmission. The exact restoration time is scheduled by another component of this disclosure, called Opportunistic Downclocking (ODoc).

After completing an RX or TX operation, the radio cannot downclock greedily. As verified experimentally, switching clock-rate takes 9.5 to 151 μs for a typical WiFi radio. During the switching, the clock is unstable, and packets cannot be detected even with SRID. To reduce the risk of packet loss, opportunistic downclocking is used to make a downclocking decision using a simple outage-prediction algorithm, which estimates if a packet is likely to arrive during the clock-rate switching.

In addition, after sending the M-preamble, a transmitter cannot wait silently during the receiver's switching period; it may otherwise lose the medium access and be preempted by other transmitters. To compensate for the switching gap, the transmitter inserts a sequence of dummy bits between the M-preamble and the 802.11 packet. The dummy bits cover the maximum switching period so that the channel is occupied continuously. Note that the transmitter always sends the M-preamble, dummy bits, and 802.11 packets at the full clock-rate. It need not know the current clock-rate of the receiver.

When multiple clients coexist, a broadcast address is assigned as well as multiple unicast addresses, each with a unique feature. This feature is embedded in the M-preamble and detectable only by the intended receiver. To reduce the overhead of M-preamble, the proposed power consumption method incorporates an optimization framework that allows multiple clients to share addresses at minimum cost. In summary, the power consumption method always runs at full clock-rate to transmit or decode packets, but downclocks the radio during IL to detect implicitly-addressed packets, whenever possible.

To realize the proposed power consumption method, the packet-detection algorithm must overcome the following challenges: (i) it must be resilient to the change of sampling clock-rate; (ii) it must be able to decode the address information directly at low sampling rates; and (iii) due to unpredictable channel condition and node mobility, its decision rule should not be tuned at runtime, and hence must be resilient against the variation of SNR.

Figure 4:
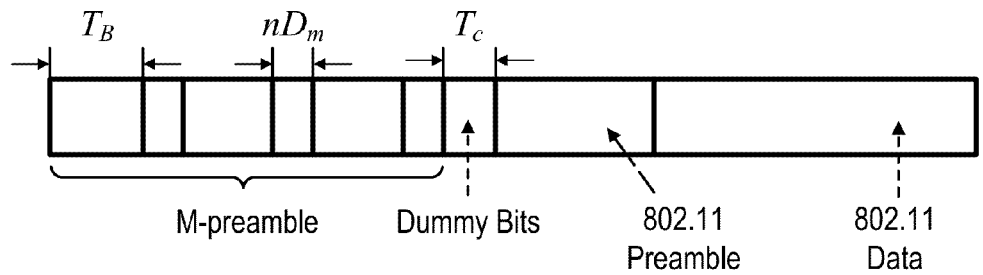
FIG. 4 is a diagram depicting an exemplary M-preamble construction integrated with a 802.11 data packet.

The M-preamble is constructed to facilitate robust, sampling-rate invariant packet detection, while implicitly delivering the address information. An M-preamble comprises $C (C \geq 2)$ duplicated versions of a pseudo-random sequence, as shown in FIG. 4 (where C=3). Within the M-preamble duration, the channel remains relatively stable, and therefore the duplicated sequences sent by the transmitter maintain strong similarity at the receiver. Hence, a receiver can exploit the strong self-correlation between the C similar sequences even if it down-samples the M-preamble.

To enhance resilience to noise, the random sequence in M-preamble must have a strong self-correlation property—it should produce the best correlation output only when correlating with itself. In an exemplary embodiment, the Gold sequence satisfies this requirement. It outputs a peak magnitude only for perfectly aligned self-correlation, and correlating with any shifted version of itself results in a low bounded magnitude. For a Gold sequence of length $L=2^l-1$ (l is an integer), the ratio between the magnitude of self-correlation peak and the secondary peak is at least $$2\frac{l-1}{2}.$$

The original Gold sequence is binary. In an alternative embodiment, a complex Gold sequence is used. To make it amenable for WiFi transceivers, a complex Gold sequence (CGS) is constructed, in which the real and imaginary parts are shifted versions of the same Gold sequence generated by the standard approach. While reference is made to the Gold sequence, it is readily understood that other type of random sequences, such as a PN sequence, fall within the scope of this disclosure.

In addition, the length of the random sequence is used to implicitly convey address information. In the exemplary embodiment, an address is an integer number n, and corresponds to a CGS of length ($T_B+nD_m$), where $D_m$ is the maximum downclocking factor of the radio hardware. $T_B$ is the minimum length of the CGS used for the preamble, also referred to as base length. To detect its own address (e.g., n), at each sampling point t, the client simply self-correlates the latest $T_B$ samples offset by $nD_m$. When the client is downclocked by a factor of D, it scales down the base length to $T_B D^{-1}$ and offset to $nD_m D^{-1}$ accordingly. The $nD_m$ value ensures that different addresses are offset by at least 1 sample, even if the CGS is downsampled by the maximum factor $D_m$.

One challenge related to the Gold sequence is that it only allows length of $L=2^l-1$. Hence, not only all of the ($T_B+nD_m$) samples can be exactly matched to a whole Gold sequence. This problem is solved by first generating a long CGS, and then assigning the sub-sequence of length ($T_B+nD_m$) to the n-th address.

Clearly, to meet its design objectives, an ideal random sequence for M-preamble should have strong self-correlation even after it is downsampled and truncated (since only $T_B$ of the $T_B+nD_m$ samples is used to perform self-correlation). It may be conjectured there does not exist such a sequence unless the sequence length is very large and the downsampling factor is small. In this disclosure, it is empirically verified that the CGS with a reasonable length suffices to achieve high detection accuracy in practical SNR ranges.

The detection algorithm is derived formally by modeling how the receiver down-samples the M-preamble and identifies it via self-correlation. Let $T=C(T_B+nD_m)$ be the total length of the M-preamble (FIG. 5), and x(t), t∈[0, T), the transmitted samples corresponding to the M-preamble. For a full-clocked receiver, the received signals are:

$$y_o(t) = e^{2\pi\Delta f t} h(t) x(t) + n(t), t \in [0, T). \quad (1)$$

where n(t) is the noise, h(t) the channel attenuation (a complex scalar representing amplitude and phase distortion), and $\Delta f$ the frequency offset between the transmitter and the receiver. When a receiver operates at the clock-rate of $$\frac{1}{D}$$

(i.e., with a downclocking factor of D) the received signals become:

$$z(k) = e^{2\pi\Delta f t} h(t) x(t) + n(t), t = kD, 0 \leq k < \left\lfloor \frac{T}{D} \right\rfloor.$$

Hence D must be an integer divisor of the base length $T_B$ of the CGS, i.e., $$\left\lfloor \frac{T_B}{D} \right\rfloor = \left\lfloor \frac{T_B}{D} \right\rfloor \triangleq T_1.$$

To detect M-preamble at each sampling point k, the receiver with address n performs self-correlation between the latest $T_1$ samples and the previous $T_1$ samples offset by $nD_m D^{-1}$, resulting in:

$$R(k) = \sum_{i=k}^{k+T_1-1} z(i) z^*(i - T_1 - nD_m D^{-1}) \quad (2)$$

$$\approx \sum_{i=k}^{k+T_1-1} e^{2\pi\Delta f iD} h(iD) x(iD) [e^{2\pi\Delta f(iD-T_B-nD_m)} \quad (3)$$

$$h(iD - T_B - nD_m) x(iD - T_B - nD_m)]^*$$

$$\approx e^{T_B + nD_m} |h(kD)|^2 \sum_{i=k}^{k+T_1-1} |x(iD)|^2 \quad (4)$$

where (•)* denotes the complex conjugate operator.

Equation (3) is derived based on the fact that the signal level is usually much higher than the noise. Equation (4) is based on the fact that (i) the random sequence x(t) preserves similarity with its predecessor sequence, even though it is downsampled; and (ii) the channel remains relatively stable over its coherence time, which is much longer than the preamble duration. To see this, note that the coherence time can be gauged as $$T_o = \frac{\lambda}{\sqrt{2\pi v}},$$

where $\lambda$ and $v$ denote the wavelength of the signal and the relative speed between the transmitter and the receiver. At a walking speed of 1 m/s, $T_o$ equals 28.8 milliseconds, whereas the M-preamble duration lasts for tens of microseconds.

Meanwhile, the energy level of $T_1$ samples is calculated as:

$$E(k) = \sum_{i=k}^{k+T_1-1} |z(i)|^2 \approx |h(kD)|^2 \sum_{i=k}^{k+T_1-1} |x(iD)|^2. \quad (5)$$

From Equations (4) and (5), |R(t)|≈E(t). By contrast, if no M-preamble presents or an M-preamble with a different address a is transmitted, then the self-correlation yields:

$$|R(k)| \approx |h(kD)|^2 \left| \sum_{i=k}^{k+T_1-1} x(iD) x(iD - T_B - aD_m)^* \right| \approx 0$$

This is because the sequence x(iD), i∈[k, k+$T_1$−1] is a truncated CGS and has strong correlation only with itself.

Figure 5:
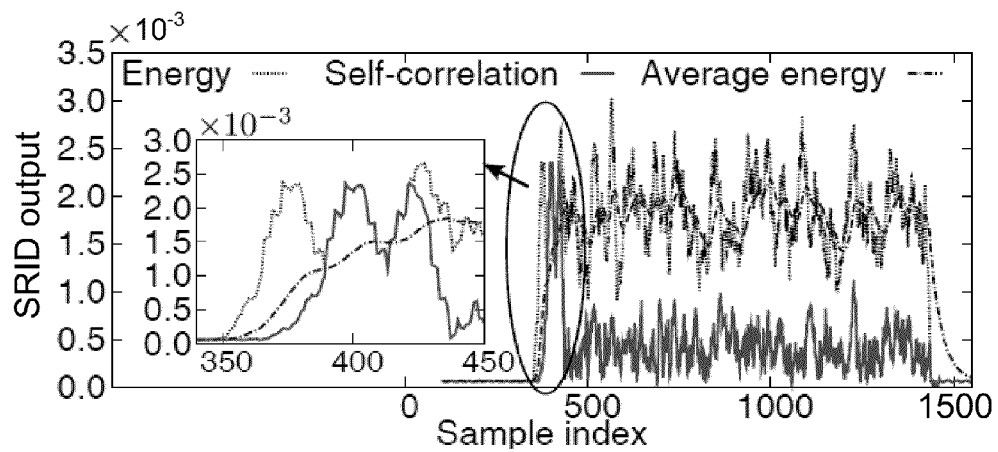
FIG. 5 is a graph illustrating detection of an M-preamble using the sampling rate invariant detection algorithm.

FIG. 5 shows a snapshot of |R(t)| and E(t) when receiving a packet prepended with M-preamble. |R(t)| aligns almost perfectly with E(t) in an M-preamble, even though the receiver is downclocked. In contrast, |R(t)| differs from with E(t) significantly if noise or uncorrelated signals are present.

Based on the above findings, SRID uses the following basic decision rule to determine the presence of an M-preamble:

$$H < |R(k)| \cdot [E(k)]^{-1} | < H^{-1} \quad (6)$$

where H is a threshold such that H≤1. This decision rule has several key advantages. First, it normalizes the self-correlation with the energy level, so H needs not be changed according to the signal strength. It will be shown experimentally below that a fixed value of H=0.9 is robust across a wide range of SNR. Second, it does not require estimation of the channel parameters or calibration of the frequency offset, and hence can be used in dynamic WLANs with user churn and mobility.

For further enhancement of resilience to noise, note that the decision rule (6) is likely to be satisfied at all the sampling points from the second to the C-th CGS (FIG. 4). There are $$\frac{(C-1)(T_B + nD_m)}{D} \triangleq T_2$$

such points at a downclocking factor D, which can offer high diversity in a noisy or fading environment. To exploit this advantage, at each sampling point k, SRID stores the decision for the past $T_2$ samples in a FIFO queue, and then apply the following enhanced rule: for $k-T_2 < i \leq k$, the number of sampling points satisfying Equation (6)≥$H_1 T_2$, where $H_1$ is a tolerance threshold and $H_1 \in (0,1]$.

In addition, during the periods when no signal is present, both the self-correlation and the energy level may be close to 0 and close to each other, and hence the decision rule (6) may be falsely triggered. To prevent such false alarms, an SNR squelch is added, which maintains a moving average of incoming signals' energy level, with the window size equal to $$E_a(k) = T_1^{-1} E(k) + (1 - T_1^{-1}) E_a(k-1) \quad (7)$$

The SNR squelch passes a sampling point to the self-correlator only if its SNR exceeds a threshold $H_s$, which corresponds to the minimum detectable SNR (set to 4 dB for SRID). Since an idle period (noise floor) usually precedes the M-preamble (with length $TD^{-1}$) due to the MAC-layer contention, the SNR level can be estimated as:

$$SNR = 10 \log_{10} \frac{E_a(t)}{E_a(t-T)} \quad (8)$$

Pseudocode for an exemplary embodiment of the sampling rate invariant detection (SRID) algorithm is as follows.

```
Input: new sample z(k + T₁ - 1) at sampling point k + T₁ - 1
Output: packet detection decision at sampling point k
    /*Update energy level of past T1 samples*/
    E(k) ← E(k - 1)|z(k + T₁ - 1)|² - |z(k - 1)|²
    /*Update average energy level*/
    Eₐ(k) ← T₁⁻¹E(k) + (1 - T₁⁻¹)Eₐ(k - 1)
    /*Update self-correlation with processor sequence*/
    R(k) ← R(k - 1) + z(k + T₁ - 1)z(k - nDₘD⁻¹ - 1)* -
           z(k - 1)z(k - 1 - T₁ - nDₘD⁻¹)*
    /*Apply SNR squelch and self-correlation decision*/
    if 10 log₁₀ E_a(k)/E_a(k-TD⁻¹) > H_s && H < |R(k)|/E(k) < H⁻¹
       then decisionQ ← push 1
       else decisionQ ← push 0
    fi
    if sum(decisionQ) > H₁ · (C - 1)(T_B + nD_m)/D
       then return 1
    fi
    return 0
```

For each timestamp (sampling point), both the self-correlation in Equation (2) and the energy level in Equation (5) can be computed by a single-step operation, which updates the metrics with an incoming signal and subtracts the obsolete signal. Hence, the algorithm has linear complexity with respect to the number of samples, and is well suited for implementation on an actual baseband signal processor. Variants of this algorithm are also contemplated by this disclosure.

Since M-preamble uses sequence length to convey address information, the addressing overhead increases linearly with network size. For a network with N nodes, the M-preamble has a maximum length of $C(T_B + ND_m)$. In an exemplary embodiment, the base length is $T_B = 64$, and CTS repetition C=3. For a medium-sized network (e.g., N=5) and a maximum downclocking factor $D_m = 4$, the entire M-preamble would have a length of 252. When transmitted at a 20 MHz sampling rate, the M-preamble would have a length of 252. When transmitted at a 20 MHz sampling rate, the M-preamble only takes $$\frac{252}{2 \times 10^7} s = 12.6 \, \mu s$$

channel time, which is comparable to the 16 µs overhead of the 802.11a/g preamble. However, for a large network, e.g., N=50, the M-preamble overhead increases to 69.6 µs, which may be overly large, especially for short packets.

To reduce the addressing overhead, multiple clients may share a limited number of addresses. Address sharing, however, introduces side effects: clients may unnecessarily trigger each other, thus incurring extra energy consumption. The proposed power consumption method makes a tradeoff by carefully allocating addresses according to clients' relative channel usage, i.e., the ratio of each client's TX&RX time to the total TX&RX time of the WLAN. The intuition behind this is that a client that transmits/receives packets more frequently should share his address with a fewer number of other clients, so as to minimize the cost of sharing.

This intuition is formalized with an optimization framework. Given the number of clients N, and the maximum address $K_m$, the optimal address allocation is sought that minimizes the overhead of method, as follows:

$$\min \sum_{k=1}^{K_m} L_k \left[ \left( \sum_{i=1}^{N} p_i u_{ik} \right) \sum_{i=1}^{N} u_{ik} \right] \quad (9)$$

$$s.t. \sum_{k=1}^{K_m} u_{ik} = 1, \forall i \in [1, N]. \quad (10)$$

$$u_{ik} \in \{0, 1\}, \forall i \in [1, N], \forall k \in [1, K_m] \quad (11)$$

where $L_k$ is the overhead when the address k is used. $p_i$ is client i's relative channel usage, and $u_{ik}$ a binary variable indicating whether or not client t uses address k. Intuitively, the objective function represents the sum of the overhead of each address, weighted by sum of the channel usages of all clients sharing that address and further multiplied by the number of such clients. The multiplication is necessary because a packet with address k triggers all clients with address k. Equation (10) enforces the constraint that each client uses only one address.

This optimization problem is a non-linear integer program, which is NP-hard in general. In an actual implementation, the solution is approximated by relaxing the integer constraint to $0 \leq u_{ik} \leq 1$, solving the resulting quadratic optimization program, and then rounding the resulting $u_{ik}$ back to its integer value. To implement the address sharing algorithm, the AP needs to periodically (e.g., every 1 minute) compute the relative channel usage $p_i$, and then broadcast the new allocation to all clients.

Figure 6:
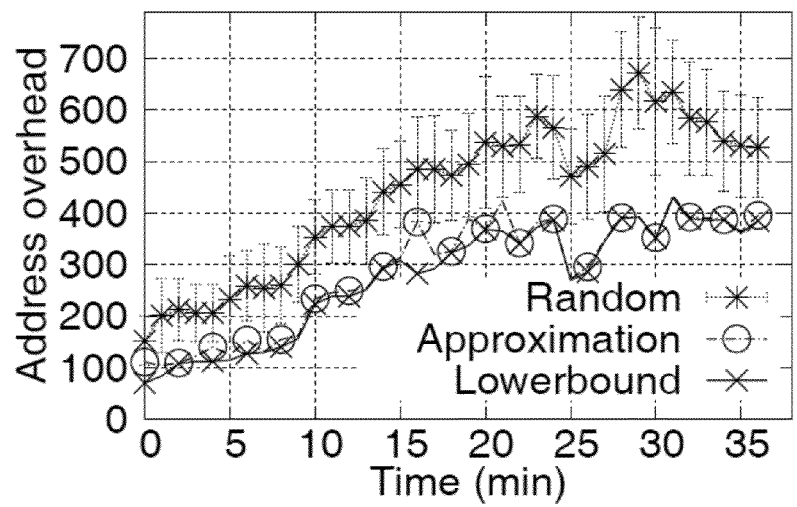
FIG. 6 is a graph illustrating performance of an address sharing scheme.

To test effectiveness of the approximation, the address sharing algorithm is run on the SIGCOMM'08 trace (assuming $K_m=5$ and $L_k=kD_m$) and total address overhead of the proposed power consumption method is plotted in FIG. 6. It is observed that the integer-rounding-based solution closely approximates the lower-bound enforced by the quadratic optimization over $0 \leq u_{ik} \leq 1$. On average, the approximate solution exceeds the lower bound by only 1.8%. FIG. 6 also shows the mean overhead of an algorithm that randomly assigns an address for each client (error bar shows standard deviation over 20 runs). Observe that the approximation algorithm can save more than 50% of overhead over the random allocation.

In addition to the address designed for each node, the proposed power consumption method assigns a broadcast address known to the access point (AP) and all clients. It corresponds to an M-preamble with address n=0. Therefore, each node needs to maintain a self-correlator with offset $nD_m=0$, in addition to the one with its own address.

For the carrier sensing purpose, a node also needs to identify the existence of packets from other transmitters. Similar to the original 802.11, SRID can perform both energy sensing and preamble detection. The former is achieved by following Equation (7). When downclocked by a factor of D, a node can only sense $D^{-1}$ of the energy compared with a full-clocked receiver. Hence, it reduces the energy detection threshold to $D^{-1}$ of the original. When preamble-based carrier sensing is necessary, it can be realized by prepending an additional broadcast preamble. When this first preamble is detected, the node determines the channel to be busy, and continues to track the energy level of the entire packet. However, it will restore full clock-rate only when it detects a second preamble, which is either addressed to it or is another broadcast preamble.

The proposed power consumption method can coexist with 802.11a/g clients even in the preamble detection mode. The 802.11a/g protocol employs self-correlation to detect a short preamble, which corresponds to a random sequence in the frequency domain, and a periodic sequence (period 16, with 10 repetitions) in the time domain. It can be considered as a subset of SRID, with base length $T_B=16$, sequence repetition C=10, node address 0 and no downclocking, and thus can be easily detected by clients that have implemented the proposed power consumption methods. On the other hand, by replacing the first preamble with an 802.11 preamble, these clients can be detected by legacy 802.11 as well.

Opportunistic downclocking, which schedules the downclocking to balance its overhead and maintain compatibility with existing MAC and sleep scheduling protocols, is presented. When switching to a new clock-rate, the radio needs to be stabilized before transmitting/receiving signals. Since the frequency synthesizer and analog circuit's center frequency remain the same, the time cost mainly comes from stabilizing the digital PLL (driving the ADC and CPU). This is only several microseconds in state-of-the-art WiFi radios. For example, in MAXIM 2831, the PLL takes less than 8 μs to stabilize itself, and the ADC and CPU needs only 1.5 μs to reset, so the total switching time is below 9.5 μs.

The switching delay of the Atheros 5414 NIC is also measured. The ath5k driver that can directly access the hardware register and reset the clock-rate is modified. After changing the clock-rate register, a baseband testing function is repeatedly checked until it returns 1 (a conventional way of verifying if the ADC and baseband processor have become ready to receive packets in ath5k), and then record the duration of this procedure.

According to the experimental results, switching between clock-rate 1 and ¼ takes 139 μs to 151 μs, whereas switching between 1 and ½ takes 120 μs to 128 μs. Note that this is a conservative estimation of the actual switching delay. To switch to a new rate, the Atheros NIC needs to reset not just the PLL, but also all registers for the OFDM decoding and MAC blocks in the CPU, so that the entire receiver chain can run a valid 802.11 mode. In contrast, the proposed power consumption method only needs to reset the PLL, while keeping the registers in the CPU intact. In addition, the latency induced by the baseband testing function and its interface to the PC host is unknown, but is included in the switching delay in the above measurement.

Henceforth, the 9.5 μs switching delay is used for the MAXIM 2831 chip as a lower bound, and the measurement result for Atheros 5414 is used as an upper bound, although opportunistic downclocking is not restricted to these bounds.

Figure 7:
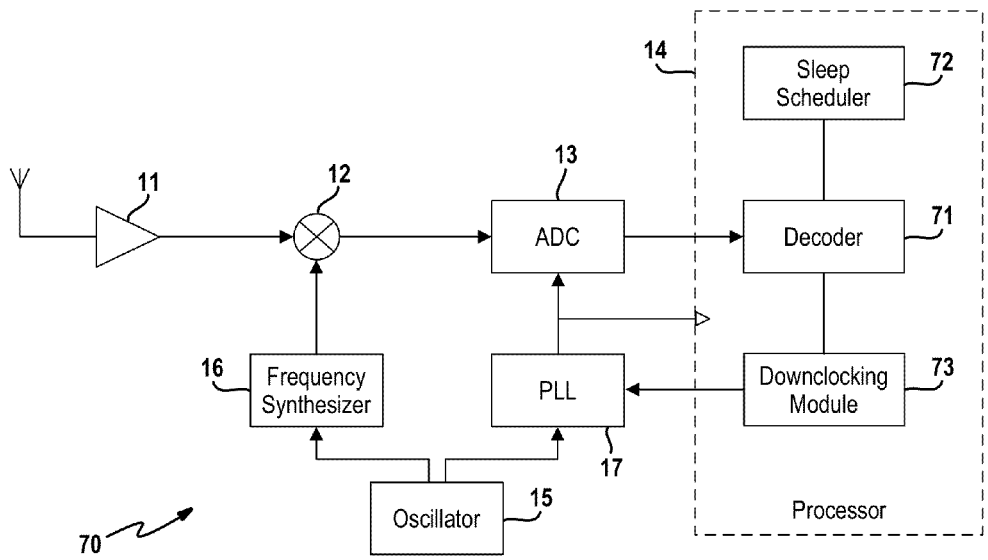
FIG. 7 is a diagram depicting the architecture of a WiFi receiver that integrates the proposed method for reducing power consumption.

FIG. 7 illustrates an exemplary embodiment for integrating the proposed power consumption techniques into a receiver 70 of a wireless device. As noted above, the analog baseband signal is sampled by an analog-to-digital converter (ADC) 13 which passes discrete samples to a processor 14. The processor 14 in turn implements various functions including a decoder 71, a sleep scheduler 72 and a downclocking module 73. It is to be understood that only the relevant functions of the processor 14 are discussed in relation to FIG. 7, but that other functions may be needed to control and manage the overall operation of the receiver. Functions may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The decoder 71 operates in accordance with a clock signal received from the clock generating circuit (i.e., PLL) 17. When the clock signal is set at a full clock rate, the decoder 71 receives the discrete samples from the ADC and decodes the discrete sample into data bits in a conventional manner. When the clock signal is set at a reduced clock rate, the decoder 71 receives the discrete samples from the ADC and applies the detection algorithm (SRID) set forth above. Rather than modify the decoder, it is envisioned that the detection algorithm may be implemented by a separate component of the receiver.

The detection algorithm (SRID) interacts with the WiFi MAC/PHY using a simple interface. On the one hand, WiFi calls the detection algorithm (SRID) to assess the channel availability. On the other hand, the detection algorithm obtains the radio's state machine from the WiFi MAC and the sleep scheduler. Whenever the radio transits to an idle listening mode, the detection algorithm calls the downclocking module 73 to determine whether and when to switch clock-rate. The downclocking module 73 determines when to switch the clock rate by implementing the opportunistic downclocking scheme further described below and also referred to herein as ODoc module. The downclocking module 73 is also interfaced with the clock generating circuit 17 to set the clock signal in accordance with this determination.

Figure 8:
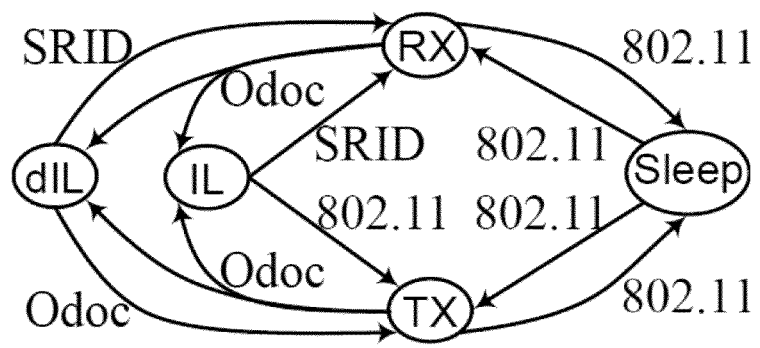
FIG. 8 is a diagram of an exemplary state machine that integrates the proposed method for reducing power consumption.

FIG. 8 illustrates an exemplary state machine that integrates the proposed power consumption techniques into the receiver. In an exemplary embodiment, the radio runs the detection algorithm (SRID) continuously in the downclocked IL (dIL) mode, and switches to the full-clocked RX mode immediately upon detection of an M-preamble. When there are packets to be transmitted, carrier sensing is performed by SRID, but the MAC schedule strictly follows the 802.11 CSMA/CA algorithm. ODoc continuously queries the 802.11 backoff counter, and reverts the radio to full clock-rate when the countdown value of the backoff counter is less than $T_c$+SIFS, where $T_c$ is the maximum switching delay, and SIFS is the short interframe space defined in 802.11. ODoc mandates the radio to perform carrier sensing within this SIFS interval after switching to full-clock rate, in order to ensure the channel remains idle after switching. Otherwise, it needs to continue carrier sensing and backoff according to 802.11

The state-transitions TX↔Sleep and RX←→Sleep are managed by 802.11 or other sleep-scheduling protocols implemented by the sleep scheduler. Whenever a TX or RX completes and the radio is not put to sleep, ODoc decides whether to switch to dIL or the normal IL mode. It makes this decision using an outage prediction scheme further described below.

ODoc's outage prediction mechanism decides if the next packet is likely to arrive before the radio is stabilized to a new clock-rate (referred to as an outage event). It first checks if there will be a deterministic operation, i.e., an immediate response of the previous operation. For example, CTS, DATA, and ACK packets are all deterministic operations to follow an RTS. Such packets are separated only by an SIFS, which is usually shorter than or comparable to the switching time, so the radio must remain at full rate in between.

When a series of deterministic operations end, ODoc checks if an outage occurred recently. It maintains a binary history for each non-deterministic packet arrival, with "1" representing that the inter-packet interval is shorter than $T_c$, and "0" otherwise. It asserts that an outage is likely to occur and remains at full clock-rate, if the recent history contains a "1". The key intuition lies in the burstiness of WiFi traffic—a short interval implies an ongoing transmission of certain data, and is likely to continue multiple short intervals until the transmission completes.

An important parameter in ODoc is the size of history. A large history size may predict an outage when it does not occur, thus missing an opportunity of saving energy by downclocking. On the other hand, a small history size results in frequent mis-detection of packets arriving within $T_c$. Fortunately, a mis-detection causes only one more retransmission, because a missed packet will be detected in its next retransmission, when the receiver has already been stabilized. Therefore, a small history size is always preferred when energy-efficiency is of high priority. As will be clarified in our experimental study, a history size of between 1 and 10 is sufficient to balance the tradeoff between false-prediction and mis-detection. Other types of outage prediction mechanisms may be integrated with the teachings of this disclosure.

Next, a detailed experimental evaluation of the proposed power consumption method is presented. Experiments center around two questions: (1) How accurate can the proposed method detect packets in a real wireless environment, and with different down-clocking rates? (2) How much of energy can the proposed method save for real-world WiFi devices and at what cost?

To answer these questions, the proposed power consumption method was implemented on software radios and network-level simulators as follows. The SRID algorithm was implemented, including the M-preamble construction and detection, on the GNURadio platform and verified on a USRP testbed. As a performance benchmark, the 802.11 OFDM preamble encoding/detection algorithm was also implemented. Energy-efficiency depends on the relative time of IL, which, in turn, depends on network delay and contention, and hence, real WiFi traces are again leveraged to evaluate the energy-efficiency of proposed method. The ODoc framework and address allocation algorithm was implemented by extending the trace-based simulator, and then integrating results from the SRID experiments. ODoc was implemented in ns-2.34, which can be used to verify the performance of the proposed method with synthetic traffic patterns (e.g., HTTP and FTP) independently.

The detection performance of SRID is tested under different SNR levels and downclocking factors. The SNR is estimated as $$SNR = \frac{E_s - E_N}{E_N},$$

where $E_s$ is the average energy level of incoming samples when a packet is present, and $E_N$ is the noise floor, both smoothed using a moving average with the window size equal to the length of the M-preamble. Note that this SNR value over-estimates the actual SNR experienced by the decoder, since the decoding modules will raise the noise level by around 3.5 dB. Given that 802.11 needs at least 9.7 dB SNR to decode packets, SRID must be able to detect packets accurately above 9.7 dB SNR.

The base length of SRID's CGS is set to $T_B=64$, and maximum downclocking factor $D_m=16$. The self-correlation threshold is fixed at H=0.9, and the tolerance threshold $H_1=0.6$. These thresholds are shown to be robust across different experimental settings.

First, SRID is tested on a single link consisting of two USRP nodes within Line-of-Sight (LOS). The receiver is downclocked by different factors, and the link's SNR is varied by adjusting the transmit power and link length/distance. Since the USRP fails to work when the external clock is downclocked to 1/16, its FPGA decimation rate is set to 16, which is equivalent to downsampling the signals by a factor of 16. Under each SNR/clock-rate setting, the transmitter sends $10^6$ packets at full clock-rate with constant inter-arrival time. The mis-detection probability ($P_m$) is calculated by the fraction of timestamps where a packet is expected to arrive but fails to be detected, and vice versa, for the false-alarm probability ($P_f$).

Figure 9A:
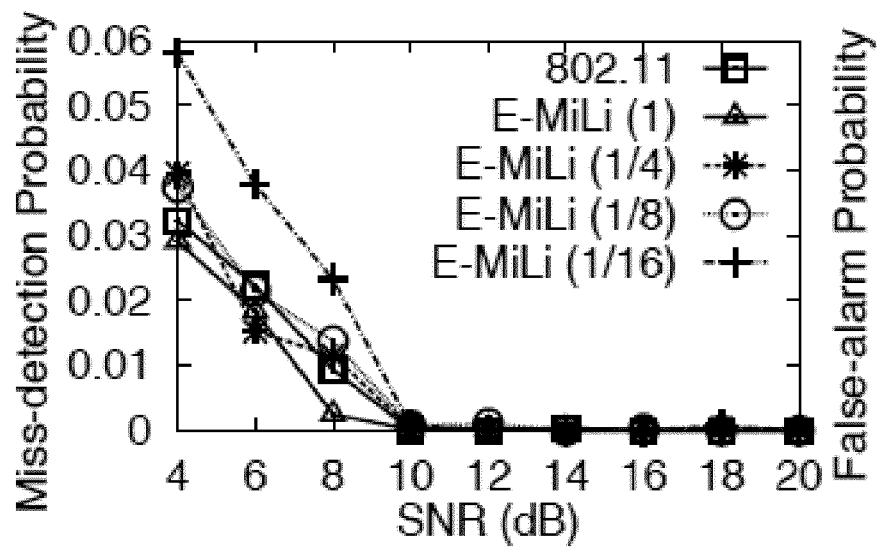
FIGS. 9A and 9B are graphs illustrating performance of the sampling rate invariant detection (SRID) algorithm.
Figure 9B:
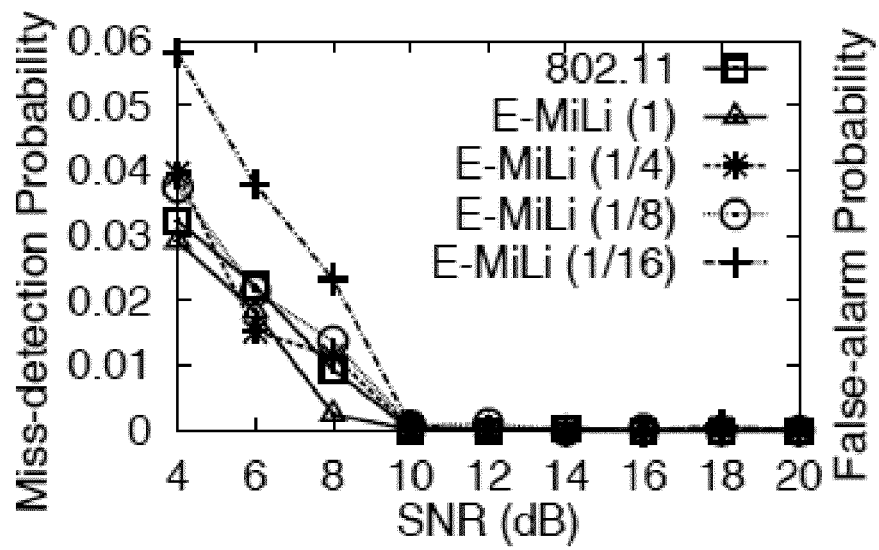

FIG. 9 plots $P_m$ and $P_f$ as a function of a link's time-averaged SNR (rounded to integer values). $P_m$ drops sharply as SNR increases, and approaches 0 as SNR grows above 8 dB. It tends to be higher under a high downclocking factor, mainly because fewer sampling points are available that satisfy the decision rule (6) and thus, SRID is more susceptible to noise. When SNR=4 dB and D=16, $P_m$ grows up to 6%. Under practical SNR ranges (above 9.7 dB), however, $P_m$ is consistently below 1% for all the clock-rates. In addition, SRID shows a comparable detection performance with 802.11. In fact, it may have lower $P_m$ when the down-clocking factor D is below 16. This is because SRID uses a longer self-correlation sequence than 802.11 (64 vs. 16), which increases its robustness to noise. The false-alarm probability $P_f$ in FIG. 9(b) shows a trend similar to $P_m$.

Figure 10:
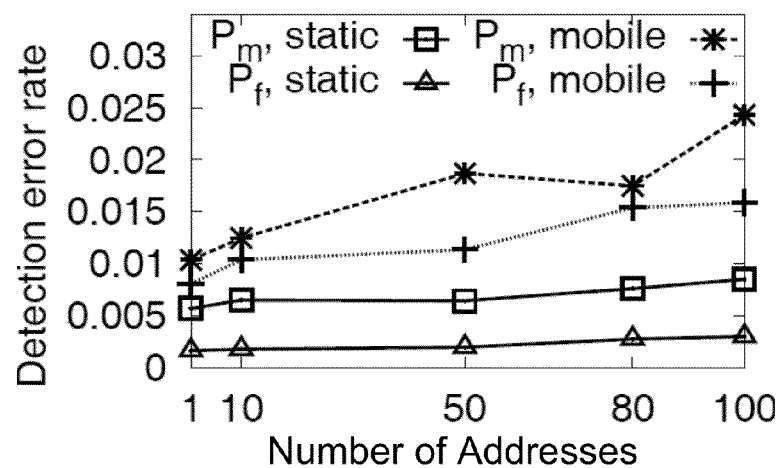
FIG. 10 is a graph illustrating the detection performance in relation to the number of unique addresses.

Recall SRID uses $nD_m$, the spacing between repetitive CGS to convey address n. A natural question is: how large can n be to ensure a high detection accuracy? FIG. 10 plots the detection performance as n increases. For a stationary link, both $P_m$ and $P_f$ remain relatively stable. This is because even for the address n=100, two self-correlation sequences are separated by 1600 samples, corresponding to 400 μs at the 4 MHz signal bandwidth of USRP, which is well below the channel's coherence time. For a mobile client (created by moving the USRP receiver around the transmitter at walking speed), the detection performance is only slightly affected by the address length, since the low mobility causes SNR variations, but does not change the coherence time significantly.

Figure 11:
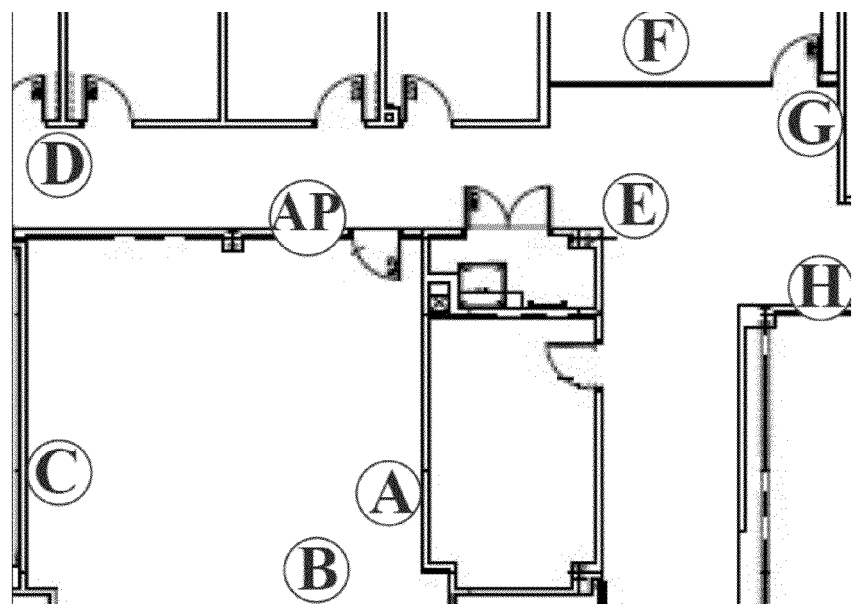
FIG. 11 is a diagram of an exemplary network topology for evaluating the SRID algorithm.

Next, SRID is evaluated on a testbed consisting of 9 USRP2 nodes (1 AP and 8 clients) deployed in a laboratory environment with metal/wood shelves and glass walls. FIG. 11 shows a map of the node locations. Node D is moving between point D and E at walking speed, and all others are stationary. This testbed enables the evaluation of SRID in a real wireless environment subject to effects of multipath fading, mobility, and NLOS obstruction. More importantly, it allows testing the false-alarm rate due to cross-correlation between different node addresses.

Figure 12A:
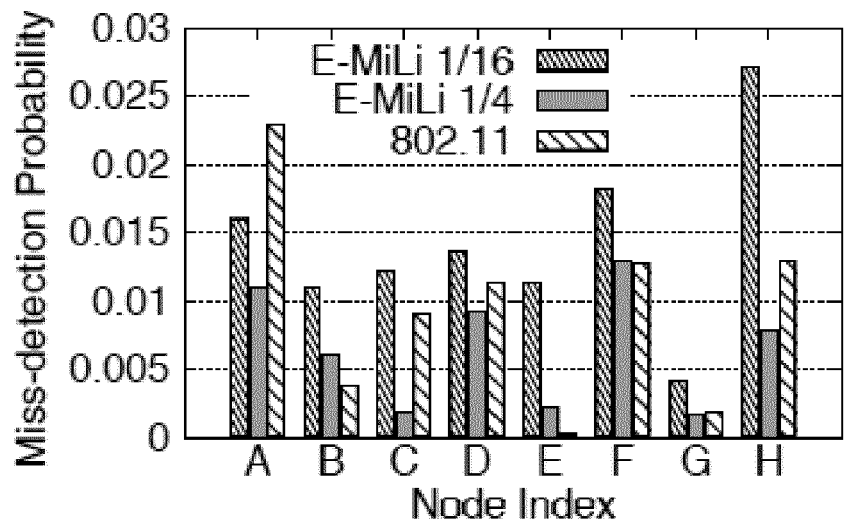
FIGS. 12A and 12B are charts illustrating SRID performance depending on node location.

Due to the limited number of external clocks, the effect of downclocking is created by changing the USRP2's decimation rate, so that the receiver's sampling rate becomes 1 to 1/16 of the transmitter's. The AP is permitted to send $10^6$ packets to each client in sequence. FIG. 12(a) shows that, depending on node locations, $P_m$ varies greatly. In general, nodes farther away (e.g., H) or obstructed by walls (e.g., F) from the AP has higher $P_m$. The mobile node D may have higher $P_m$ than a node farther from the AP but is stationary (e.g., node E). Consistent with the single link experiment, the downclocking factor 4 results in comparable $P_m$ with 802.11.

Figure 12B:
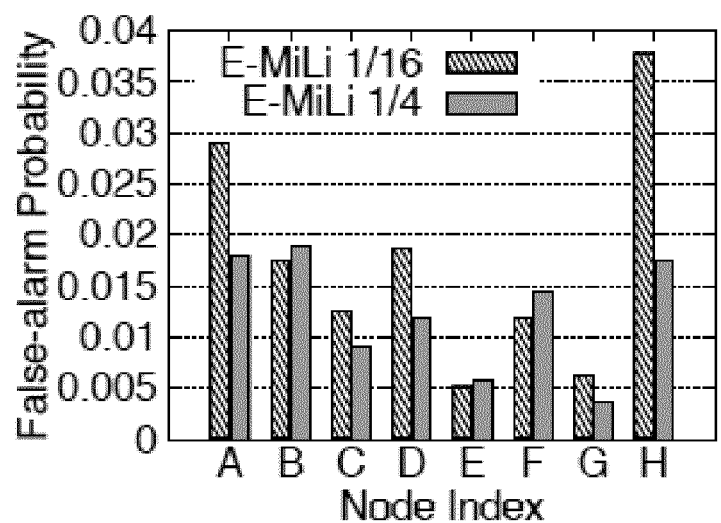

FIG. 12(b) shows the false-alarm probability due to cross-correlation, i.e., the probability that a client detects packets addressed to others. The relative $P_f$ for different clients shows a similar trend as $P_m$, depending on the location and mobility. Unlike the single link case, the $P_f$ tends to be larger than $P_m$, because the cross-correlation between sequences has stronger effects on $P_f$ than pure D=16, $P_f$ is below 0.04, implying negligible energy cost due to false triggering. Note that for 802.11, the address field must be decoded from the packet, so $P_f$ here is not meaningful for it.

From the above experiments, observe that SRID has close to 100% detection accuracy (and is comparable to 802.11) under practical SNR ranges and with down-clocking rate up to 16. Hence, it can be used to realize the proposed power consumption method in practical wireless networks.

Energy-efficiency was then evaluated through trace-based simulation. WiFi and USRP power-consumption statistics were obtained from actual measurements. The 151 μs switching time of the Atheros AR5414 NIC is used as the worst-case estimate of switching delay, assuming the power consumption during clock switching is the same as in full-clocked mode. As we will clarify, an outage due to the switching delay occurs with a less than 4.2% probability, so it is assumed an outage event does not affect the WiFi traces except causing one retransmission. In addition, adopt the $P_m$ and $P_f$ values at 8 dB as a conservative estimation of the packet loss or false alarm caused by SRID. Unless mentioned otherwise, 15 addresses are allocated and shared among all clients, and a history size of 5 is used in ODoc.

Figure 13A:
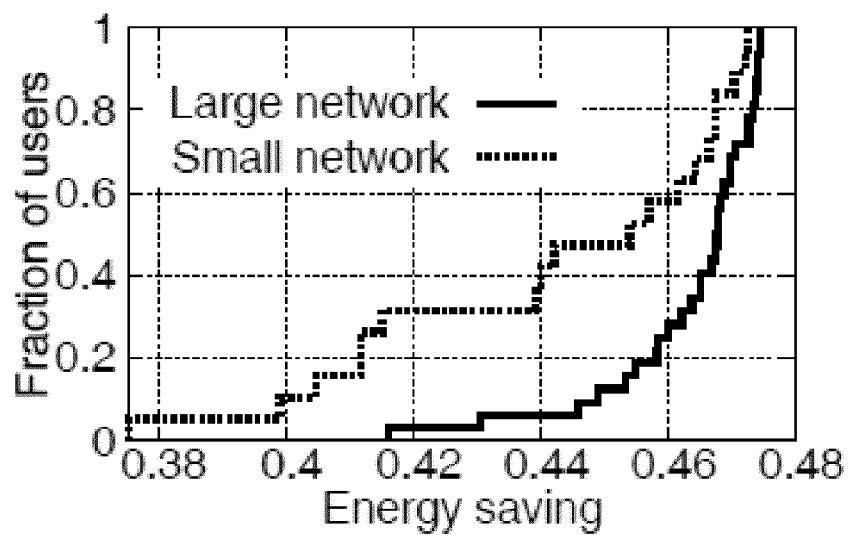
FIGS. 13A and 13B are graphs illustrating energy savings for the proposed method for reducing power consumption.
Figure 13B:
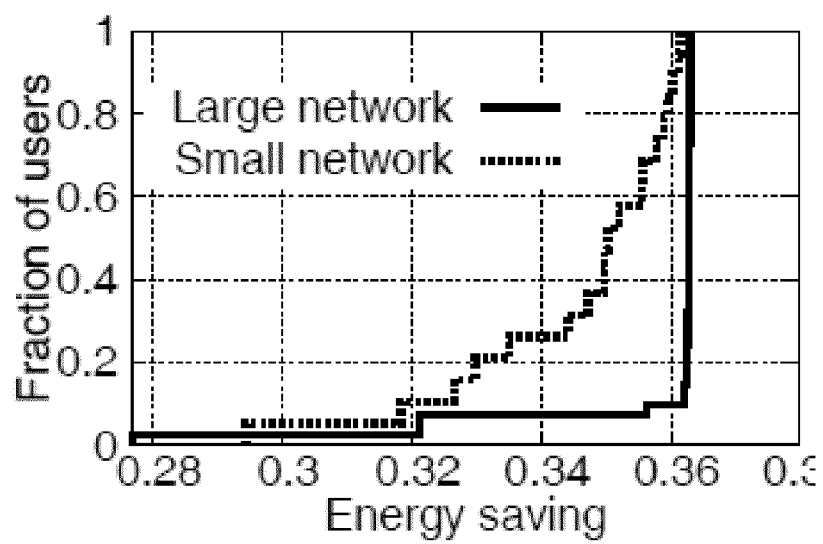

FIG. 13(a) illustrates the energy-saving of the proposed power consumption method, assuming clients are using WiFi devices with a maximum downclocking factor of 4. For a large network (SIGCOMM'08 traces), the energy saving ranges from 41% to 47.3%. Its CDF is densely concentrated-for around 92% of clients, the energy saving ranges between 44% and 47.2%, which is close to the 47.5% energy-saving when a client remains in downclocked IL mode. In a small network (PDX-Powell traces) with less contention, IL induces less energy cost, so the energy-saving ratio of proposed method is relatively low. However, since IL time still dominates, the median saving remains around 44%, and minimum 37.2%. FIG. 13(b) plots the results assuming clients' power consumption is the same as the USRP device with a maximum downclocking factor of 8. Again, the energy-saving is concentrated near 36.3%, the saving in pure IL mode.

These experiments reveal that the proposed power consumption method can explore the majority of IL intervals to perform downclocking. Its energy-saving ratio can be roughly estimated as $\eta = \eta_c P_{IL}$, where $\eta_c$ is the energy-savings ratio in pure IL mode using the maximum downclocking factor, and $P_{IL}$ the percentage of idle listening energy during a radio's lifetime. Since $P_{IL}$ is close to 1 for most clients, $\eta$ is close to $\eta_c$.

Figure 14A:
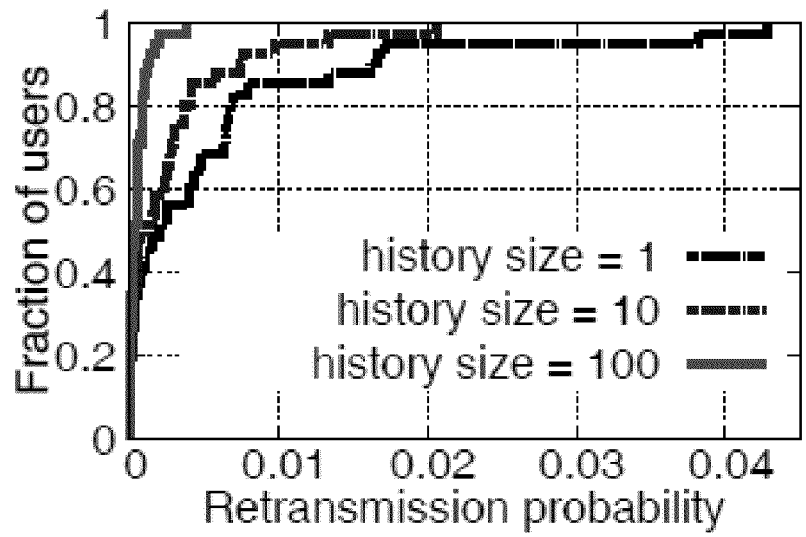
FIGS. 14A and 14B are graphs illustrating the performance of the proposed method for reducing power consumption with different history sizes.
Figure 14B:
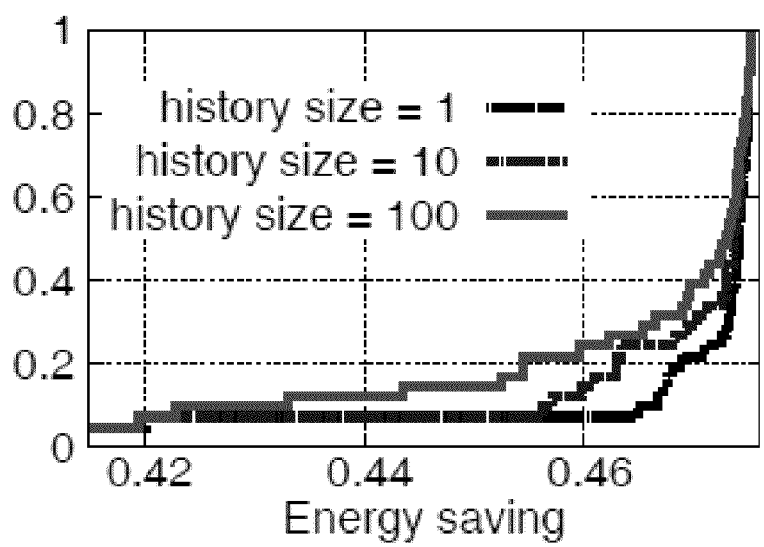

The overhead of the proposed power consumption method comes from mis-detection (and retransmission) due to a packet arriving in between the switching time. Such events can be alleviated by ODoc's history based outage prediction mechanism. In another experiment, the cost of such outage is evaluated and the effectiveness of ODoc in alleviating it. FIG. 14(a) shows that when history size equals 1, 4.2% packets may need to be retransmitted for some clients. With a history size of 10, retransmission is reduced to below 0.8% for 90% of clients. A further increase of the history size to 100 shows only a marginal improvement. On the other hand, FIG. 14(b) shows a small history size results in higher energy-efficiency, implying that the energy savings from aggressive downclocking dwarfs the small waste due to retransmissions. Hence, a small history size is preferable for ODoc if energy-efficiency is of high priority.

To further understand benefits and cost under controllable network conditions, the proposed power consumption method is implemented and tested in ns-2.34. Compare performance of the legacy WiFi (including both CAM and PSM), and the proposed method (referred to as CAM+E-MiLi). The PHY/MAC parameters of ns2 were modified to be consistent with that in 802.11g, and fix the data rate to 6 Mbps. Implement ODoc based on 802.11, and configure it in a similar manner to the trace-driven simulator. The PSM module builds on the 802.11 PSM extension to ns-2, and the power consumption statistics follow our measurement of AR5414.

Two exemplary applications are evaluated: web browsing and FTP. A web browsing application is simulated using the PackMIME http traffic generator in ns-2, which provides realistic stochastic models of HTTP flows. The network consists of one HTTP server connecting to a WLAN AP via an ADSL2 link, with 1.5 Mbps (0.5 Mbps) downlink (uplink) bandwidth and exponentially distributed delay with mean 15 ms. The AP serves one HTTP client (with mean page request interval of 30 s) and multiple background clients. The effect of background traffic is studied by running fixed-rate (200 Kbps, 512-byte packet size) UDP file transfer between the AP and the background clients.

Figure 15A:
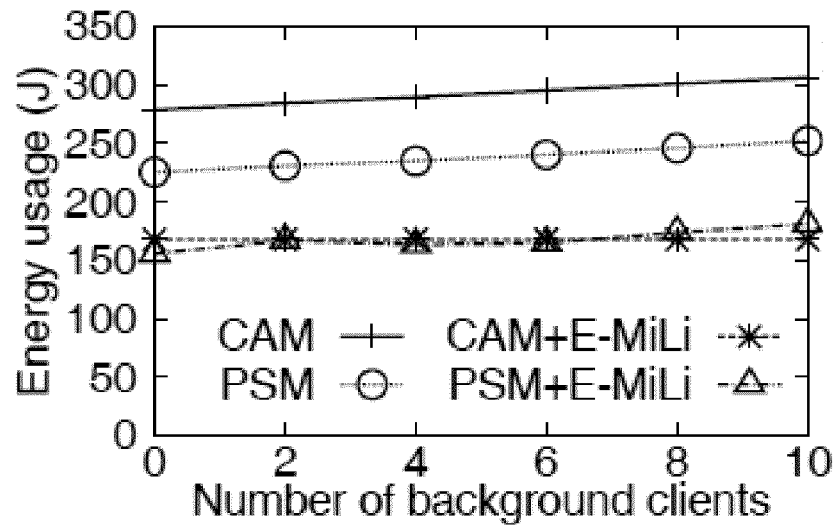
FIGS. 15A and 15B are graphs illustrating the performance of a web browsing session.

FIG. 15(a) shows the energy usage of a 5-minute web-browsing session. PSM shows around 18% energy saving over CAM. CAM+E-Mili saves 39.8% of energy over CAM without background traffic, and 47.1% when the number of background clients grows to 10. Since PSM optimizes the sleep schedule of clients, the ratio of IL time is less, compared to CAM, and thus PSM+E-MiLi achieves less energy saving (33% to 37.1%) than CAM+E-MiLi. Also, note that the proposed method is relatively insensitive to background traffic, as it can enforce address filtering even at low clock-rate.

Figure 15B:
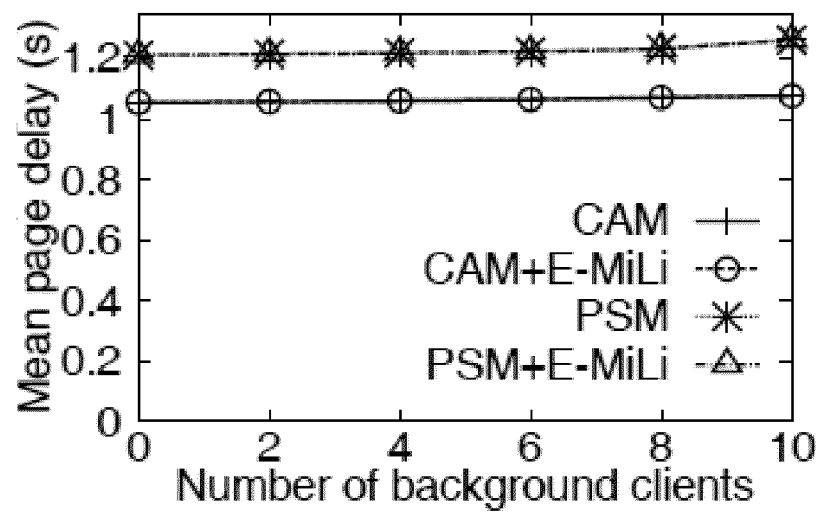

FIG. 15(b) plots the average per-page delay during the web-browsing session. Clearly, the proposed method incurs a negligible delay when integrated into legacy WiFi. Although the M-preamble and clock switching costs channel time, it is much shorter than the network and contention delay. Notably, PSM incurs a longer delay than CAM due to its sleep scheduling mechanism, and CAM+E-MiLi has a shorter delay, yet higher energy-efficiency than PSM.

Figure 16A:
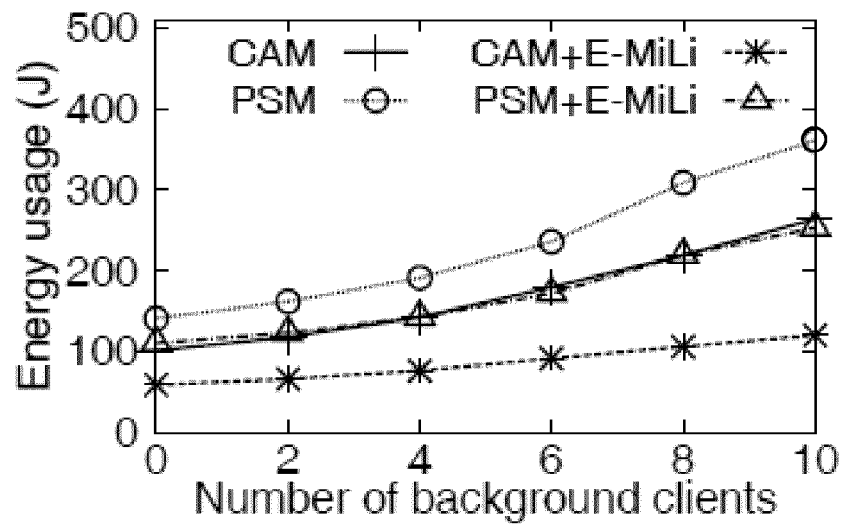
FIGS. 16A and 16B are graphs illustrating performance of downloading a file using a file transfer protocol.
Figure 16B:
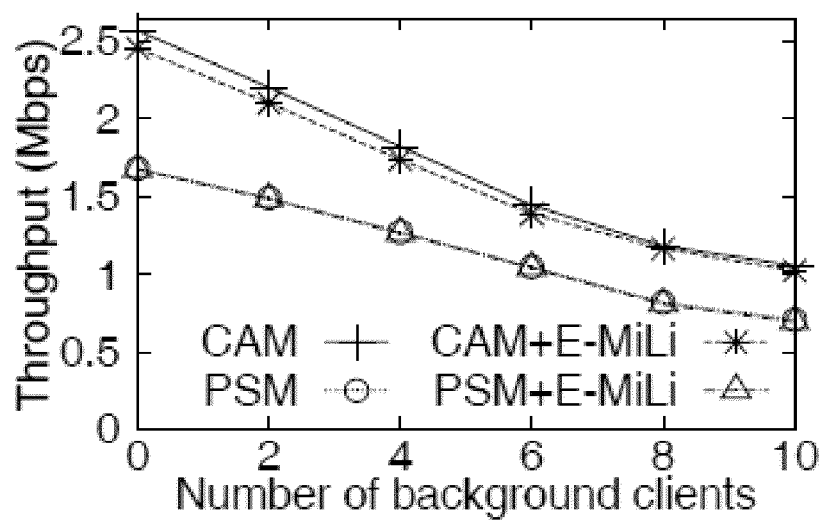

Second, the proposed power consumption method is evaluated using the FTP traffic generator in ns-2, assuming a client downloads a 20 MB file (with packet size 1 KB) directly from the AP. Compared to the fixed-duration web-browsing, the FTP's energy usage is more sensitive to the background traffic (FIG. 16(a)), because the downloading duration is prolonged by MAC-layer contention. PSM is found to consume 36.8% to 39.4% more energy than CAM, due to the fact that it may result in higher energy-per-bit than CAM. In addition, although the proposed method achieves a similar level of energy saving as in the Webbrowsing, it may degrade the FTP throughput by up to 4.4% in the absence of background traffic (FIG. 16(b)). This is due mainly to its overhead, i.e., the switching delay, the extra channel time of the M-preamble, and the imperfect detector and outage predictor that incur MAC-layer retransmissions. Moreover, note that it is assumed no end-to-end delay and the throughput depends only on MAC contention, which zooms in the overhead from the proposed method.

Figure 17A:
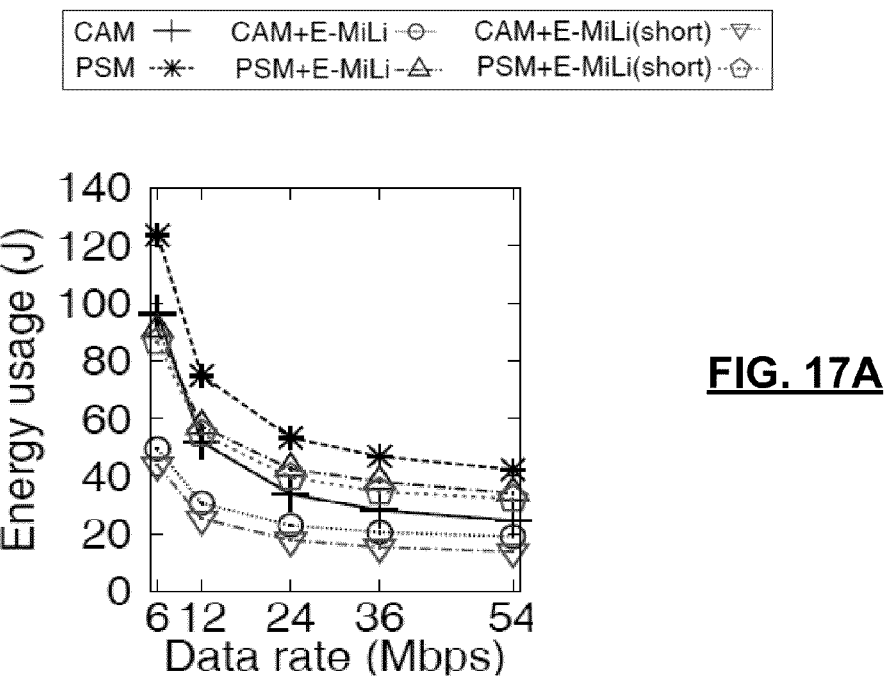
FIGS. 17A and 17B are graphs illustrating performance of downloading a file when data rate varies.
Figure 17B:
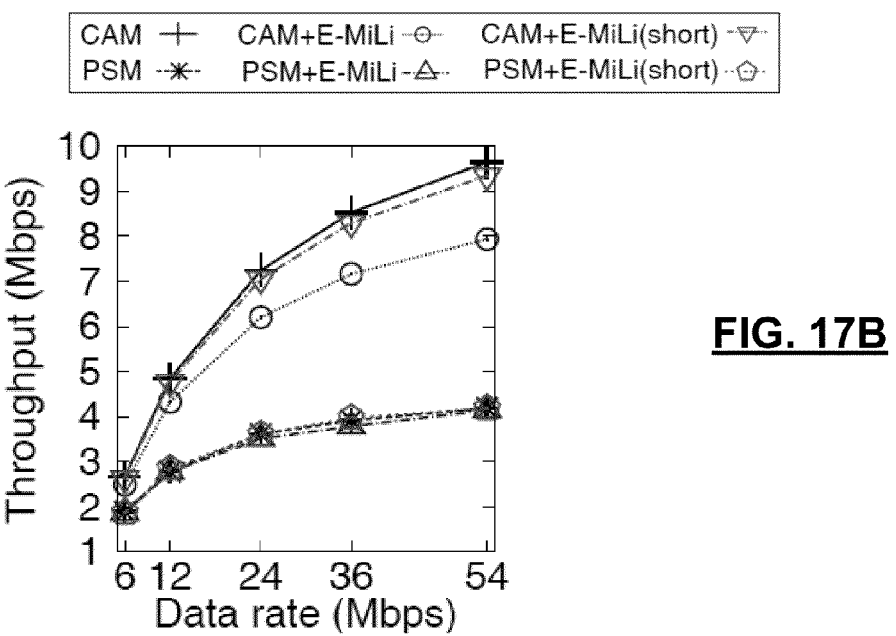

One caveat is that the overhead of the M-preamble and the switching delay are fixed, whereas the channel time for transmission of useful data decreases as the data rate increases. The overhead of proposed method will thus be amplified at a high data rate. This effect is illustrated by varying the PHY-layer data rate for a file transfer (using FTP) with the number of contending clients fixed at 6. FIG. 17 shows that as the data rate increases, CAM+E-MiLi causes CAM more throughput degradation, and the amount of energy saving decreases due to the longer time in transferring the data. When the data rate reaches 54 Mbps, CAM+E-MiLi degrades the throughput of CAM by 17.6%, while saving 23.1% of energy. However, when taking advantage of the short switching delay of recent WiFi chipset (e.g., 9.5 μs in MAXIM 2831), the throughput degradation is negligible, and the energy saving ratio is consistently around 40% for all data rates. In addition, E-MiLi sees no throughput degradation when integrated with PSM, and the resulting energy saving is kept around 30%.

It should be noted that the effect of fixed preamble overhead is an inherent problem of high data-rate 802.11 protocols, and can be resolved by standard solutions such as the packet aggregation in 802.11n. Further, the effects of overhead of proposed method becomes less severe in a busy network, where contention is high and the channel time consumed by preamble and switching overhead becomes negligible compared to the contention delay. In addition, throughput is a critical metric only for rate-intensive applications like FTP. Mobile wireless devices are more likely to be dominated by elastic traffic such as VoIP and HTTP. Such traffic patterns tend to incur a significant amount of idle listening time, and, as already exemplified in our Web browsing experiments, they can make substantial energy saving by using the proposed method.

The overhead of the proposed power consumption method is fixed even if the NIC were equipped with a MIMO transceiver. The overhead of the proposed method mainly comes from the preamble and the clock switching delay. For MIMO systems such as 802.11n, all the RF chains of a receiver detect a single preamble embedded in each packet, and then uses different preambles for channel estimation. Similarly, when using the proposed method, they can share the same M-preamble for packet detection. In addition, the clock switching delay depends on the PLL settling time of each RF chain. Modern MIMO transceivers may either allow the RF chains to share the same PLL, or equip each RF chain with a separate PLL. In the former case, the switching delay is fixed and shared among all RF chains. In the latter case, the settling time of all RF chains is similar and can overlap with each other.

In summary, neither the preamble overhead nor the switching delay increases with the number of MIMO RF chains. Therefore, the proposed power consumption method works for modern MIMO NICs without introducing any extra overhead unlike the case of SISO NICs.

A receiver employs SRID to detect packets intended for itself, and is able to carrier-sense other packets via energy detection. However, energy sensing alone may not be enough to address a pathological case, i.e., the hidden terminal problem. In IEEE 802.11, virtual carrier sensing is an optional solution, which requires an RTS/CTS handshake before the actual data transmission. The RTS/CTS packet piggy-backs a duration of the forthcoming data packet. Neighboring transmitters overhear the RTS/CTS and extend the channel's busy time by the corresponding duration.

In the proposed method, virtual carrier sensing can be simply realized as follows. A transmitter/receiver prepends RTS/CTS with the broadcast preamble, so that all neighboring nodes can detect the RTS/CTS, restore full-clock rate and decode the duration field using a legacy 802.11 decoder. Then, as in the 802.11 virtual carrier sensing mechanism, if the forthcoming data packet is not intended for it, a node will enter the sleep mode and remain there throughout the packet duration. Since the data packet's duration is usually much longer than the RTS/CTS, the energy consumption in decoding RTS/CTS is dominated by the energy savings with sleep, and the savings in IL energy remain the same. Hence, with this simple mechanism, the proposed method will retain its advantages over legacy approaches with virtual carrier sensing enabled.

When the proposed method coexists with legacy WiFi, the AP needs to discriminate them and prepend the M-preamble only for packets destined for applicable clients. The discrimination should be initialized during the association process, when a newly joined client notifies the AP about its capability, and subsequently the AP runs the address allocation algorithm to assign an address to it (and possibly reassign addresses to existing clients using the address allocation algorithm).

Energy-efficiency has long been a paramount concern for portable WiFi devices. Many MAC-level scheduling protocols have been proposed to reduce the energy wasted by IL. The proposed power consumption method can be integrated with these and other MAC-level energy-saving solutions, by adding the downclocked IL mode into their state machine. The proposed method can also work in CAM, thus overcoming the excessive delay typically seen in PSM-style protocols.

An alternative way of reducing the cost of IL is to wake up the receiver on demand. The wake-on-wireless scheme augments a secondary low-power radio for packet detection, and triggers the primary receiver only when a new packet arrives.

The proposed method also adopts the philosophy of on-demand packet processing. Its energy saving may be less than wake-on-wireless, because it needs to keep the analog circuit active in IL. Its advantage is that no extra radio is required. In fact, it only requires a change of firmware to support the construction and detection of M-preamble, and adjustment of clock-rate. Proposed method can also be used with wake-on-wireless to optimize the power consumption of the secondary radio.

In sensor networks, a popular MAC-layer energy saving mechanism is low-power listening (LPL), which is used by S-MAC, B-MAC and many derivatives. Since sensor networks typically run low-rate, small duty-cycle applications, LPL shifts more power consumption to the transmitter side, thus reducing the time spent in idle listening. Specifically, a receiver periodically wakes up to detect packets from the transmitter, and the transmitter uses a long preamble that spans that period to ensure detectability. Similar to the WiFi's PSM, LPL is a sleep scheduling mechanism that reduces the IL time, and can be enhanced by integrating with the proposed power consumption method. For example, since the proposed method reduces IL power, it can shorten the receiver's wakeup period, thereby shortening the transmitter's preamble length and lowering its power consumption.

The general idea of correlation-based packet detection is not new. As mentioned above, the 802.11 OFDM PHY incorporates a preamble that allows self-correlation-based detection. Its variants have also been used in other software-radio implementations. In the proposed method, a new preamble mechanism is presented that preserves the self-correlation property even when it is downsampled. Cross-correlation-based packet detection (i.e., correlating the incoming signal with a known sequence) is an alternative way of detecting packets, but cannot detect downsampled signals and is more susceptible to the frequency offset.

Dynamic voltage-frequency scaling (DVFS) is a mature technology used in microprocessor design. It exploits the variance in processor load, lowering the voltage and clock-rate when few tasks are pending, and raising it when the processor is heavily loaded. It has also been proposed for Gigabit wireline links and for audio signal processing. The key idea is to observe the peak frequency of the incoming workload and then limit the processor's clock-rate to that level. DVFS has not been used for improving the energy-efficiency for wireless radios, due mainly to a well-known paradox: the radio should be activated only after detecting a packet, but to detect the packet, the radio must always be active at its full sampling rate. This paradox is overcome by separating packet detection and decoding, and performing both at different rates. One approach is partly based on the experiments by Chandra et al, who found WiFi NIC's power consumption to scale linearly with the sampling bandwidth and proposed a sampling algorithm to adjust the bandwidth according to the traffic load. The proposed sample algorithm uses the same clock-rate for detection and decoding, and can only adjust clock-rate at a coarse-grained level, because the transmitter and the receiver must agree on the same clock-rate before packet transmissions.

The proposed method has wider implications for wireless design than what we have explored in this paper. Its simple MAC/PHY interface facilitates its integration with other carrier sensing based wireless networks, such as ZigBee sensor networks. In addition, by changing the voltage along with clock-rate, additional energy savings can be achieved.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor. The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for reducing power consumption of a wireless communication device, comprising:
   reducing, by a receiver in the device, clock rate of a clock during an idle listening period of the device, the reduced clock rate being less than a full clock rate and the clock operating a receiver of the device;
   detecting, by the receiver, a preamble of a data packet at the reduced clock rate, the data packet received by the receiver during the idle listening period;
   determining, by the receiver, whether the data packet is intended for the device by correlating data in a preamble of the data packet, where the preamble is comprised of a random sequence of data bits duplicated two or more times and separation between the duplicate sequences is indicative of an address of the device; and
   restoring, by the receiver, clock rate of the clock to the full clock rate when the data packet is intended for the device.

2. The method of claim 1 further comprises continuing to operate the clock at the reduced clock rate when the data packet is not intended for the device.

3. The method of claim 1 wherein determining a correlation between data in the preamble of the data packet further comprises computing a metric indicative of similarity between data bits from one random sequence in the preamble and data bits from another random sequence in the preamble, and restoring the clock rate of the clock to the full clock rate when the correlation metric exceeds a threshold value.

4. The method of claim 3 further comprises computing an average energy level for the data bits from the one random sequence and normalizing the correlation metric using the average energy level for the data bits.

5. The method of claim 1 wherein the length of the random sequence is a function of an integer indicative of the address of the device and a maximum factor for downclocking the clock rate.

6. The method of claim 1 wherein the random sequence is derived from a Gold sequence.

7. The method of claim 1 further comprises allocating an address to two or more devices in a network environment.

8. The method of claim 1 further comprise determining likelihood of a data packet will arrive at the device while transitioning the clock from a full clock rate to the reduced clock rate prior to the step of reducing the clock rate of the clock and continuing to operate the clock at the full clock rate when the likelihood exceeds a threshold value.

9. A method for reducing power consumption of a wireless communication device, comprising:
    reducing, by a receiver in the device, clock rate of a clock during an idle listening period of the device, the reduced clock rate being less than a full clock rate and the clock operating a receiver of the device;
    sampling, by the receiver, data of a data packet at the reduced clock rate, the data packet received by the receiver during the idle listening period;
    determining, by the receiver, a correlation between data in a preamble of the data packet, where the preamble is comprised of a random sequence of data bits duplicated two or more times and separation between the random sequences is indicative of an address of the device;
    restoring, by the receiver, clock rate of the clock to the full clock rate when correlation between data bits exceeds a threshold; and
    continuing to operate the clock at the reduced clock rate when correlation between data bits does not exceed the threshold.

10. The method of claim 9 wherein determining a correlation between data bits in the preamble of the data packet further comprises computing a metric indicative of similarity between the sampled data from one random sequence in the preamble and the sampled data from another random sequence in the preamble, and restoring the clock rate of the clock to the full clock rate when the correlation metric exceeds a threshold value.

11. The method of claim 10 further comprises computing an average energy level for the sampled data from the one random sequence and normalizing the correlation metric using the average energy level for the sampled data.

12. The method of claim 9 wherein separation between the random sequences is a function of an integer indicative of the address of the device and a maximum factor for downclocking the clock rate.

13. The method of claim 9 wherein the random sequence is derived from a Gold sequence.

14. The method of claim 9 further comprise determining likelihood of a data packet will arrive at the device while transitioning the clock from a full clock rate to the reduced clock rate prior to the step of reducing the clock rate of the clock and continuing to operate the clock at the full clock rate when the likelihood exceeds a threshold value.

15. A receiver for a wireless communication device, comprising:
    a clock circuit operable to generate a clock signal at one of a full clock rate and a reduced clock rate, where the reduced clock rate is less than the full clock rate;
    a downclocking module interfaced with the clock generator and operable to set the clock signal to the reduced clock rate during an idle listening period; and
    a decoder configured to receive and decode data bits of a data packet, wherein the decoder operates in accordance with the clock signal received from the clock generator, wherein the decoder determines a correlation between data bits in a preamble of the data packet, where the preamble is comprised of a random sequence of data bits duplicated two or more times and separation between the random sequences is indicative of an address of the device.

16. The receiver of claim 15 further comprises an analog-to-digital converter configured to receive a data signal and sample the data signal in accordance with the clock signal from the clock generator.

17. The receiver of claim 15 wherein the decoder operates to set the clock signal to the full clock rate when correlation between the data bits exceeds a threshold and to set the clock signal to the reduced clock rate when correlation between the data bits does not exceed the threshold.

18. The receiver of claim 15 wherein the decoder operates to compute a metric indicative of similarity between the data bits from one random sequence in the preamble and the sampled data bits from another random sequence in the preamble, and sets the clock signal to the full clock rate when the correlation metric exceeds a threshold value.

19. The receiver of claim 18 wherein the decoder computes an average energy level for the data bits from the one random sequence and normalizes the correlation metric using the average energy level for the data bits.

20. The receiver of claim 15 wherein the length of the random sequence is a function of an integer indicative of the address of the device and a maximum factor for downclocking the clock rate.

21. The receiver of claim 15 wherein the random sequence is derived from a Gold sequence.

22. The receiver of claim 15 wherein the decoder determines likelihood that a data packet will arrive at the device before transitioning the clock signal from a full clock rate to the reduced clock rate and continues to operate the clock at the full clock rate when the likelihood exceeds a threshold value.

* * * * *